(12) United States Patent
Xian et al.

(10) Patent No.: US 12,556,906 B2
(45) Date of Patent: Feb. 17, 2026

(54) METHOD AND DEVICE FOR RECONSTRUCTING LOST DATA OF MARINE WIRELESS SENSOR NETWORKS

(71) Applicant: Shanghai Maritime University, Shanghai (CN)

(72) Inventors: Jiangfeng Xian, Shanghai (CN); Junling Ma, Shanghai (CN); Huafeng Wu, Shanghai (CN); Yongsheng Yang, Shanghai (CN); Yuanyuan Zhang, Changzhou (CN); Xiaojun Mei, Shanghai (CN); Xinqiang Chen, Shanghai (CN); Chaofeng Li, Shanghai (CN); Qiannan Zhang, Shanghai (CN); Linian Liang, Shanghai (CN)

(73) Assignee: Shanghai Maritime University, Shanghai (CN)

( * ) Notice: Subject to any disclaimer, the term of this patent is extended or adjusted under 35 U.S.C. 154(b) by 291 days.

(21) Appl. No.: 18/456,478

(22) Filed: Aug. 26, 2023

(65) Prior Publication Data
US 2025/0031031 A1    Jan. 23, 2025

(30) Foreign Application Priority Data

Jul. 20, 2023    (CN) .......................... 202310897506.6

(51) Int. Cl.
*H04W 8/30*    (2009.01)
*G06N 3/04*    (2023.01)
(Continued)

(52) U.S. Cl.
CPC ................ *H04W 8/30* (2013.01); *G06N 3/04* (2013.01); *G06N 5/022* (2013.01); *H04L 45/24* (2013.01); *H04W 16/26* (2013.01); *H04W 84/18* (2013.01)

(58) Field of Classification Search
CPC ....... H04W 8/30; H04W 16/26; H04W 84/18; H04W 40/32; H04W 4/38; H04W 40/02;
(Continued)

(56) References Cited

U.S. PATENT DOCUMENTS 6,304,556 B1 *  10/2001  Haas ..................... H04W 40/26
                                                    370/254
6,493,759 B1 *  12/2002  Passman ............... H04W 84/20
                                                    455/448
(Continued)

FOREIGN PATENT DOCUMENTS

CN    101355390 B  *  8/2011  ............ H04W 40/02
CN    103533674 B  *  6/2016  ............ H04W 84/18
(Continued)

*Primary Examiner* — Jenee Holland
(74) *Attorney, Agent, or Firm* — Piloff Passino & Cosenza LLP; Rachel K. Piloff; Sean A. Passino

(57) ABSTRACT

Provided are a method and a device for reconstructing lost data of marine wireless sensor networks (MWSNs). The data reconstruction method includes following steps: establishing an initial topological structure of the MWSNs; using an improved hierarchical energy balance multipath (IHEBM) routing protocol to cluster network nodes; using an improved radial basis function neural network (RBFNN) to predict lost data of nodes in the cluster based on a clustering of the nodes; and using a centralized principal component analysis (PCA) method to compress and reconstruct data of a cluster head node in a process of data transmission from a cluster head to a ship base station.

5 Claims, 7 Drawing Sheets

(51) Int. Cl.
*G06N 5/022* (2023.01)
*H04L 45/24* (2022.01)
*H04W 16/26* (2009.01)
*H04W 84/18* (2009.01)

(58) Field of Classification Search
CPC .......... G06N 3/04; G06N 5/022; G06N 3/048;
G06N 3/08; H04L 45/24; H04L 45/08;
H04L 45/14; H04L 45/46; Y02D 30/70
See application file for complete search history.

(56) References Cited

U.S. PATENT DOCUMENTS

| | | | |
|---|---|---|---|
| 7,002,470 B1 * | 2/2006 | Miao | H04B 1/71635 |
| | | | 340/539.22 |
| 7,035,240 B1 * | 4/2006 | Balakrishnan | H04W 84/18 |
| | | | 709/224 |
| 7,177,295 B1 * | 2/2007 | Sholander | H04W 40/26 |
| | | | 370/338 |
| 9,480,013 B2 * | 10/2016 | Fang | H04W 48/16 |
| 12,108,320 B2 * | 10/2024 | Fan | H04L 45/48 |
| 12,124,282 B2 * | 10/2024 | Zhang | G05D 1/644 |
| 2004/0157557 A1 * | 8/2004 | Barnett | H04W 36/00835 |
| | | | 455/445 |
| 2006/0262721 A1 * | 11/2006 | Radunovic | H04W 28/18 |
| | | | 370/252 |
| 2008/0221836 A1 * | 9/2008 | Tateson | G01D 9/005 |
| | | | 702/188 |
| 2012/0014289 A1 * | 1/2012 | Ortega | H04W 52/04 |
| | | | 370/255 |
| 2015/0186775 A1 * | 7/2015 | Cruz Mota | G06F 30/20 |
| | | | 706/46 |
| 2019/0141495 A1 * | 5/2019 | Jha | H04W 40/026 |
| 2019/0230575 A1 * | 7/2019 | Han | H04W 4/38 |
| 2021/0211967 A1 * | 7/2021 | Zeev | H04L 45/46 |
| 2021/0392068 A1 * | 12/2021 | Li | H04L 45/123 |
| 2022/0041255 A1 * | 2/2022 | Qin | B63B 35/00 |
| 2022/0108262 A1 * | 4/2022 | Cella | G05B 17/02 |
| 2022/0256431 A1 * | 8/2022 | Liu | H04L 45/48 |
| 2025/0097684 A1 * | 3/2025 | Xian | H04W 4/90 |
| 2025/0097733 A1 * | 3/2025 | Verma | H04W 24/02 |
| 2025/0151011 A1 * | 5/2025 | Hasegawa | G01S 5/0236 |

FOREIGN PATENT DOCUMENTS

| | | | | | |
|---|---|---|---|---|---|
| CN | 111356108 B | * | 3/2020 | ............ | H04W 24/02 |
| CN | 109525956 B | * | 6/2020 | ............ | H04W 40/10 |
| CN | 108683468 B | * | 9/2020 | ............ | H04W 24/06 |
| CN | 108289285 B | * | 11/2020 | ............ | H04W 28/04 |
| CN | 111356198 B | * | 2/2022 | ............ | H04W 40/02 |
| CN | 111565430 B | * | 11/2022 | ............ | H04W 40/04 |

* cited by examiner

METHOD AND DEVICE FOR RECONSTRUCTING LOST DATA OF MARINE WIRELESS SENSOR NETWORKS

CROSS-REFERENCE TO RELATED APPLICATIONS

This application claims priority to Chinese Patent Application No. 202310897506.6, filed on Jul. 20, 2023, the contents of which are hereby incorporated by reference.

TECHNICAL FIELD

The disclosure relates to a technical field of data reconstruction of marine wireless sensor networks (MWSNs), and in particular to an energy-efficient and high-precision method and a device for reconstructing lost data of the MWSNs.

BACKGROUND

As a key technology of marine monitoring, marine wireless sensor networks (MWSNs) have been widely used in marine exploration and ecological environment monitoring, especially in marine oil pollution diffusion monitoring and control, marine water quality real-time monitoring and forecasting, and marine information collection and detection, and have good application prospects and important research significance. Whilst global marine stereo monitoring networks are gradually established, the amount of data collected in diverse marine observation ways has increased exponentially, with main characteristics of multi-source, heterogeneity and multi-dimension, thus bringing many challenges to data analyzing and reconstructing the sensor network in the marine environment. Specifically these challenges are as follows: 1) the topology of the network is highly dynamic due to the influence of wind, waves and currents when the monitoring nodes are deployed on the sea surface, so as a result, the spatial-temporal correlation of data collected by different nodes is more complicated, and network clustering is more difficult; 2) the communication between nodes is affected by the wave shielding effect, thus making the wireless channel of the network unstable, leading to the easy loss of data in the transmission process, and making the data reconstruction more difficult; 3) the energy and bandwidth resources of the MWSNs are very limited, so the collected data is directly transmitted to the convergence terminal without compression, and the life cycle of the network is greatly affected. In addition, as one of the methods to prolong the network life cycle, clustering of nodes in the wireless sensor networks has the characteristics of improving network scalability, saving energy consumption and reducing routing delay, and has been widely used. In particular, the data collected in large-scale and densely deployed MWSNs have strong temporal and spatial correlation, and lay a foundation for the next step of the accurate reconstruction of marine lost data using the spatial-temporal correlation within the cluster.

Most of the methods proposed in the existing research are based on a static environment, which fails to fully consider the mobility of wireless sensor network (WSN) nodes, especially in the case that the MWSNs nodes are more complex in dynamics, the wireless channel is unstable and the congestion probability caused by data explosion is high, so it is difficult to accurately reconstruct the lost data of the MWSNs. However, it is necessary to obtain a complete and accurate data set in the marine environmental monitoring.

Therefore, in view of the above characteristics, it is necessary to propose a new data reconstruction method to reconstruct lost data in the MWSNs in an energy-efficient and high-precision manner.

SUMMARY

The purpose of the present disclosure is to overcome the problem of accurate reconstruction in the case of large-scale loss of marine big data and to provide an energy-efficient and high-precision method for reconstructing lost data of marine wireless sensor networks (MWSNs).

The purpose of the disclosure may be achieved by a following technical scheme:

as a first aspect of the present disclosure, a method for reconstructing lost data of the MWSNs is provided, including following steps:

establishing an initial topological structure of the MWSNs;

using an improved hierarchical energy balance multipath (IHEBM) routing protocol to cluster network nodes;

using an improved radial basis function neural network (RBFNN) to predict lost data of nodes in the cluster based on a clustering of the nodes; and using a centralized principal component analysis (PCA) method to compress and reconstruct data of a cluster head node in a process of data transmission from cluster heads to a ship base station.

Further, goals of clustering MWSNs nodes by the IHEBM routing protocol include:

prolonging a service life of the MWSNs through distributed energy consumption, reducing control costs, realizing clustering in a relatively dynamically changing iteration number and obtaining evenly distributed cluster heads; specific steps of node clustering include a cluster head selection and a cluster member formation.

Further, specific steps of the cluster head selection are as follows:

calculating a probability of each node being selected as a cluster head candidate node in the MWSNs and broadcasting a first message to other nodes, where the first message includes a node number and the probability of the node being selected as the cluster head candidate node; indexes used for calculating the probability of a node i being selected as the cluster head candidate node include: a distance between the node i and the ship base station; residual energies of the node i and neighbor nodes; mutual distances between the node i and the neighbor nodes; and a density of the neighbor nodes of the node i;

if a probability of the node i being selected as the cluster head candidate node is greater than probabilities of all neighbor nodes j of the node i being selected as the cluster head candidate node, finally selecting the node i as the cluster head candidate node; if the probability of the node i being selected as the cluster head candidate node is less than probabilities of all neighbor nodes j of the node i being selected as the cluster head candidate node, sending a join message by the node i to all neighboring nodes having a greater probability of being selected as the cluster head candidate node and the node i being a member node of the cluster;

broadcasting a second message by each temporary cluster head selected as the cluster head candidate node, where the second message includes a node number and a probability of the node being selected as the cluster head candidate node; when a temporary cluster head $ch_j$ receives the second message broadcast by a temporary cluster head $ch_i$, the temporary cluster head $ch_j$ calculates a distance between the temporary cluster head $ch_j$ and the temporary cluster head $ch_i$; if the distance is greater than or equal to a threshold value $d_{th}$, the second message is ignored; if the distance is less than the threshold value $d_{th}$, and the probability of the node j being selected as the cluster head candidate node is less than the probability of the node i being selected as the cluster head candidate node, the temporary cluster head $ch_j$ becomes an ordinary node and sends a join message to the finally selected cluster head $ch_i$.

Further, the probability P (node i=ch) of the node i being selected as the cluster head candidate node is specifically expressed as follows:

$$P(\text{node } i = ch) - \min \sum_{i,j=1}^{n} ((\partial_1(i,j), \partial_2(i,j), \partial_3(i,j))$$

$$\partial_1(i,j) = 1 - \eta_1\left(1 - \ln\left(\frac{d_{i,BS}}{d_{j,BS}}\right)\right)$$

$$\partial_2(i,j) = 1 - \eta_2\left(1 - \ln\left(\frac{\mu_i}{\mu_j}\right)\right)$$

$$\partial_3(i,j) = 1 - \eta_3\left(1 - \ln\left(\frac{E_i}{E_j}\right)\right)$$

where $d_{i,BS}$ is a distance between the node i and the ship base station BS, $d_{j,BS}$ is a distance between the neighbor node j of the node i and the ship base station BS, $\mu_i$ is a number of neighbor nodes of the node i, $\mu_j$ is a number of neighbor nodes of the neighbor node j of the node i, $E_i$ and $E_j$ are residual energies of the node i and the neighbor node j respectively, $\eta_1$, $\eta_2$ and $\eta_3$ are constants; the greater the value P (node i=ch) is, the greater the probability that the node i becomes the cluster head is.

Further, specific steps of the cluster member formation include:
the cluster head sends a third broadcast message to neighbor nodes of the cluster head; after receiving the third broadcast message, a non-cluster head node selects the cluster head with a higher probability of being selected as the cluster head candidate node and closer to the ship base station, and sends a join message to the corresponding cluster head node to join a cluster set.

Further, the non-cluster head node calculates $\text{Join}_{ch,j}$ after receiving the third broadcast message:

$$\text{Join}_{ch,j} = \min\left(\frac{P(\text{node } j = ch)}{d_{i,ch_j} + d_{ch_j,BS}}\right)$$

where $d_{i,ch_j}$ is a distance from a non-cluster head node i to the cluster head node $ch_j$, $d_{ch_j,BS}$ is a distance between the cluster head node $ch_j$ and the ship base station BS; P (node j=ch) is a probability of the cluster head node j being selected as the cluster head candidate node; when a value of $\text{Join}_{ch,j}$ reaches the minimum, a value of P (node j=ch) reaches the maximum and a value of $(d_{i,ch_j}+d_{ch_j,BS})$ reaches the minimum, the non-cluster head node selects the cluster head with a larger value and closer to the ship base station and joins the corresponding cluster set.

Further, a clustering radius of the node is a time-varying value with the change of the network topology, and is dynamically adjusted by comprehensively considering node mobility, network load and the number of broadcast message of the cluster head candidate node.

Further, specific steps of predicting node lost data by the improved RBFNN include:
in a data loss cluster, obtaining the optimal structure of the RBFNN by training the marine data, and accurately predicting node lost data by using the trained RBFNN;
when a training sample $X_k$ is input, a result $y_{kj}$ of a j-th output neuron of the RBFNN is:

$$y_{kj} = w_{0j} + \sum_{i=1}^{I} w_{ij}\phi(X_k, X_i), j = 1, 2, ..., J$$

where $X_i$ is a center of a basis function, k is a number of hidden layer nodes, $w_{ij}$ is a weight between an i-th hidden neuron and the j-th output neuron, and $\phi(X_k,X_i)$ is a radial basis function; the optimal number k of the hidden layer nodes and the center $X_i$ of the basis function of the hidden layer of the improved RBFNN are determined by a clustering technology in the IHEBM routing protocol.

Further, specific steps of compressing and reconstructing the cluster head node data by using the centralized PCA method are as follows:
obtaining the initial marine perception data in the sampling period, where the initial data obtained by the cluster head includes: a real marine sensing measurement value sent by the cluster member node to the cluster head, a predicted value generated at the cluster head and a real measurement value of the cluster head node; $X=[x_1, x_2, ..., x_M]^T \in \mathfrak{R}^{M \times P}$ represents a collected perceptual data set, M and P represent respectively a discretization time threshold and a number of nodes in the cluster, that is, row vectors of the perceptual data set X corresponds to P sensor nodes, and column vectors of the perceptual data set X corresponds to the measured values sent to the cluster head node by all cluster member nodes in a sampling period M;

centralizing the initial marine perception data to obtain a centralization matrix $X_{mean}$;

calculating the principal component, decomposing a covariance matrix $$C = \frac{1}{M} X_{mean}^T X_{mean}$$

into eigenvalues, sorting the obtained eigenvalues according to a size $\lambda_1 \geq \lambda_2 \geq ... \geq \lambda_p$, and obtaining a component importance score matrix B:

$$B = X_{mean}A = [b_1, b_2, ..., b_p]$$

where $A=[\lambda_1, \lambda_2, ..., \lambda_p]$;
a cumulative contribution rate T(q) of the first q principal components is defined as follows:

$$T(q) = \frac{\sum_{i=1}^{q} \lambda_i}{\sum_{i=1}^{p} \lambda_i}$$

obtaining the original marine data and returning the original marine data, and recording $\tilde{B}=[b_1, b_2, \ldots, b_q]$ as scores of the first q principal components of the centralization matrix $X_{mean}$, q is less than p; the exact approximation of $X_{mean}$ is calculated as follows:

$$\tilde{Y} = \tilde{B}\tilde{A}^T$$

where $\tilde{A}=[\lambda_1, \lambda_2, \ldots, \lambda_q]$, if q=p, no information is lost; based on the data matrix $\tilde{B}_{M\times q}$, $\tilde{A}_{P\times q}$ and a mean value $\bar{x}$, a reconstruction data Y of the original marine data is as follows:

$$\tilde{Y} = \tilde{B}\tilde{A}^T + \overline{X}, \overline{X} = [\bar{x}_1, \bar{x}_2, \ldots, \bar{x}_p].$$

As a second aspect of the present disclosure, a device for reconstructing lost data of the MWSNs is provided, including a memory, a processor, and a program stored in the memory, and when the processor executes the program, the method for reconstructing lost data of the MWSNs is realized.

Compared with the prior art, the embodiment has following beneficial effects:

first, the embodiment provides a data prediction algorithm, the data prediction algorithm is based on node clustering, uses the IHEBM routing protocol to achieve marine node clustering, and adopts the RBFNN, and an accurate prediction of marine lost data by efficiently mining the temporal and spatial correlation between the node and the neighbor nodes;

second, in order to further improve the accuracy of data prediction after the nodes of the MWSNs are clustered, the embodiment uses an improved RBFNN to accurately predict the lost marine data values of the nodes by training historical data to approximate the nonlinear relationship; and third, in the process of data transmission from the cluster head to the ship base station, the centralized PCA method is used to compress the marine data at the cluster head node and reconstruct the data at the ship base station, therefore the data transmission in the MWSNs is effectively reduced, thus greatly reducing the network energy consumption and prolonging the network life cycle.

DETAILED DESCRIPTION OF THE EMBODIMENTS

The present disclosure is described in detail with the attached drawings and a specific embodiment. This embodiment is implemented on the premise of the technical scheme of the present disclosure, and the detailed implementation and specific operation process are given, but the protection scope of the present disclosure is not limited to the following embodiments.

Embodiment 1

Figure 2:
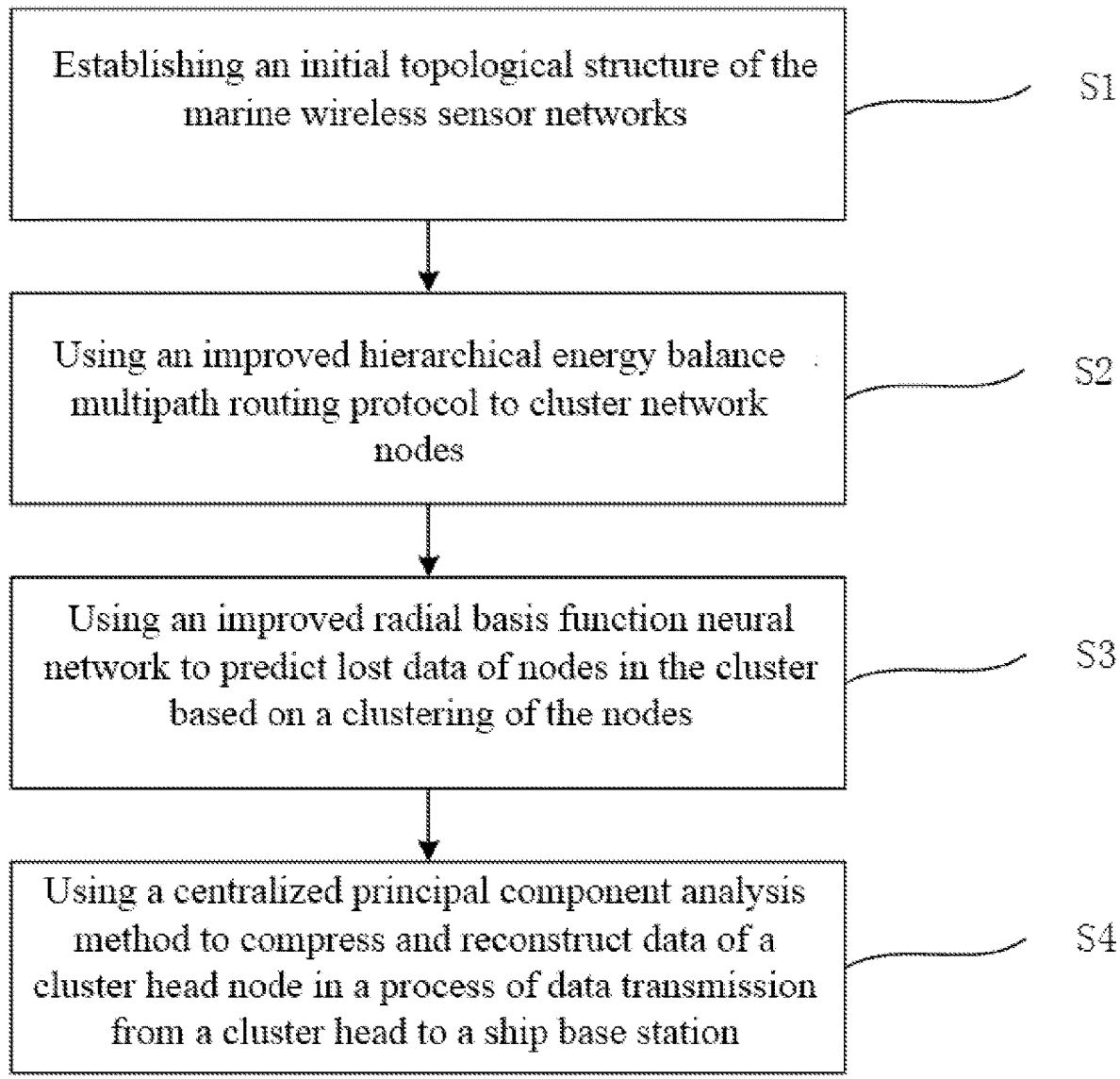
FIG. 2 is a flow chart of a method for reconstructing lost data of the MWSNs according to the present disclosure.

On the basis of comprehensively considering the complexity and particularity of the marine wireless sensor networks (MWSNs), aiming at the characteristics of prediction and reconstruction of the lost data of the MWSNs, the disclosure discloses an energy-efficient and high-precision method for reconstructing lost data of the MWSNs. In order to reduce the network energy consumption and improve the network scalability, an improved hierarchical energy balanced multipath (IHEBM) routing protocol is proposed to cluster marine nodes, and then a radial basis function neural network (RBFNN) is used to predict the lost data values of nodes. Then, in the process of data transmission from the cluster head to the ship base station, a centralized principal component analysis (PCA) method is used to compress and reconstruct the cluster head node data, thereby effectively reducing the data transmission from the cluster head node to the ship base station, and achieving the purposes of reducing the communication overhead of the network and prolonging the service life of the network. As shown in FIG. 2, the energy-efficient and high-precision method for reconstructing the lost data of the MWSNs includes following steps:

S1, establishing an initial topological structure of the MWSNs;

S2, using the IHEBM routing protocol to cluster network nodes;

S3, using an improved RBFNN to predict lost data of nodes in the cluster based on a clustering of the nodes;

S4, using the centralized PCA method to compress and reconstruct data of a cluster head node in a process of data transmission from a cluster head to a ship base station.

Figure 1:
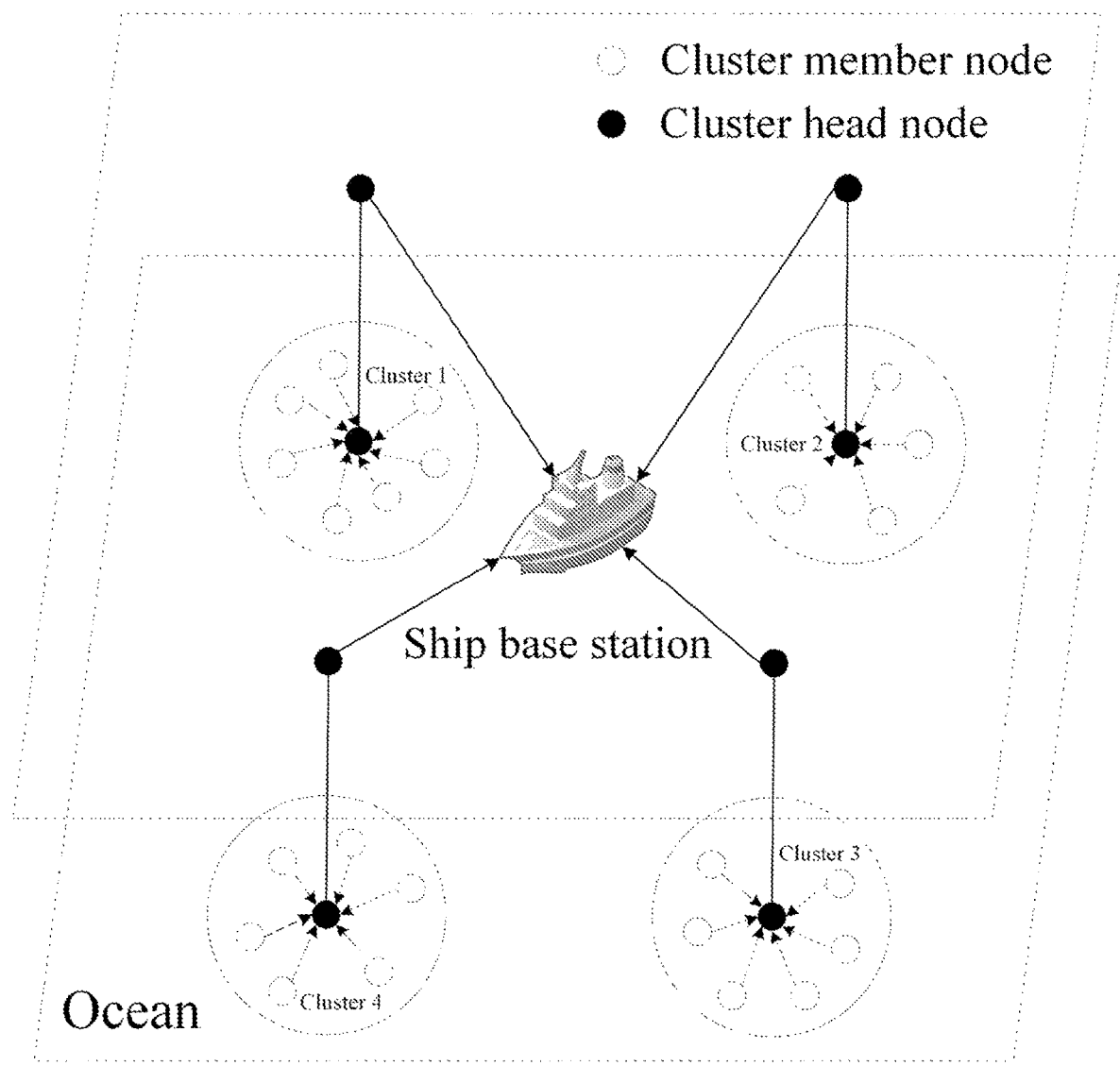
FIG. 1 is a schematic diagram of a typical marine wireless sensor networks (MWSNs) clustering model.

The S1 specifically includes:

Because marine sensor nodes have limited energy and are not easy to replace batteries or charge, it has become an important research issue to design an energy-efficient network structure in the application of the MWSNs. In order to prolong the network life cycle, the method of clustering sensor nodes has been widely used. FIG. 1 shows a typical MWSNs clustering model, where the lower layer is cluster member nodes and the upper layer is the cluster head node. The cluster head not only undertakes the same marine data sensing work as ordinary nodes, but also acts as a relay node to fuse and process marine data and send the data to the ship base station. In the upper layer of the network model, the ship base station only receives the data from the cluster head node and transmits the processed data to the user. The IHEBM routing protocol is proposed to cluster the nodes of the MWSNs. There are four main objectives in the selection of cluster heads and the formation of cluster members in the IHEBM routing protocol: prolonging a service life of the MWSNs through distributed energy consumption, reducing control overhead (proportional to the number of MWSNs nodes), realizing clustering in a relatively dynamically changing iteration number, and obtaining evenly distributed cluster heads. The probability P (node i=ch) of a node being selected as a cluster head candidate node is determined by following four indicators in a proper proportion: 1) a distance between the node i and the ship base station; 2) residual energies of the node i and neighbor nodes; 3) mutual distances between the node i and the neighbor nodes; 4) a density of the neighbor nodes of the node i (measured by the number of neighbor nodes). Based on the above analysis, the disclosure defines the following formula to calculate P (node i=ch):

$$\partial_1(i,j) = 1 - \eta_1\left(1 - \ln\left(\frac{d_{i,BS}}{d_{j,BS}}\right)\right) \quad (1)$$

$$\partial_2(i,j) = 1 - \eta_2\left(1 - \ln\left(\frac{\mu_i}{\mu_j}\right)\right) \quad (2)$$

$$\partial_3(i,j) = 1 - \eta_3\left(1 - \ln\left(\frac{E_i}{E_j}\right)\right) \quad (3)$$

$$P(\text{node } i = ch) = \min\sum_{i,j=1}^{n}((\partial_1(i,j), \partial_2(i,j), \partial_3(i,j)) \quad (4)$$

where $d_{i,BS}$ is a distance between the node i and the ship base station BS, $d_{j,BS}$ is a distance between the neighbor node j of the node i and the ship base station BS, $\mu_i$ is a number of neighbor nodes of the node i, $\mu_j$ is a number of neighbor nodes of the neighbor node j of the node i, $E_i$ and $E_j$ are the residual energies of the node i and the neighbor node j respectively, P (node i=ch) is the probability of the node i being selected as the cluster head, and the greater the P (node i=ch) value, the greater the probability of the node i being the cluster head, $\eta_1$, $\eta_2$ and $\eta_3$ are constants with a value of 0 or 1. $\partial_1(i, j)$ is a combined quantized value of indicators 1) and 3), $\partial_2(i, j)$ is the quantized value of the indicator 4) and $\partial_3(i, j)$ is the quantized value of indicator 2).

Each node calculates the P (node i=ch) value in the MWSNs and broadcasts a first message (CH-ADV) to other nodes. The first message includes the node number and the P (node i=ch) value of the node.

Under the action of wind and waves, the clustering radius is a time-varying value for the whole MWSNs with the change of network topology. It is necessary to comprehensively consider the node mobility, network load and the number of broadcast message of the cluster head candidate nodes, and dynamically adjust the clustering radius by adjusting the node transmission power.

If the P (node i=ch) value of the node i is greater than the P (node i=ch) value of all neighbor nodes j, the node i is finally selected as a cluster head candidate node. If the P (node i=ch) value of the node i is less than the P (node i=ch) value of one of neighbor nodes j, the node i sends a join message to the neighbor node with a larger P (node i=ch) value and becomes a member node of the cluster.

Each selected cluster head candidate node above are selected as a temporary cluster head $ch_i$, and should broadcast a second message CCH-ADV, the second message CCH-ADV includes the node number $ID_i$ and the P (node i=ch) value. When the temporary cluster head $ch_j$ receives the information broadcast by the temporary cluster head $ch_i$, the temporary cluster head $ch_j$ calculates a distance between the temporary cluster head $ch_j$ and the temporary cluster head $ch_i$. If this distance value is not less than a threshold value $d_{th}$, the second message is ignored. However, if the distance value is less than the threshold value $d_{th}$ and P (node i=ch) is greater than P (node j=ch), then the temporary cluster head $ch_j$ becomes an ordinary node and sends a join message Join-Msg to the finally selected cluster head $ch_i$.

Cluster formation stage: In this stage, the cluster head first broadcasts a message Adv-Msg to the neighbor nodes. After receiving the message Adv-Msg, other non-cluster head nodes calculate $\text{Join}_{ch,j}$ and then join the cluster set by sending the join message Join-Msg to the corresponding cluster head node.

$$\text{Join}_{ch,j} = \min\left(\frac{P(\text{node } j = ch)}{d_{i,ch_j} + d_{ch_j,BS}}\right) \quad (5)$$

where $d_{i,ch_j}$ is a distance from the node i to the cluster head node $ch_j$, $d_{ch_j,BS}$ is a distance between the cluster head node $ch_j$ and the ship base station BS. When the value $\text{Join}_{ch,j}$ reaches the minimum, the value P (node j=ch) reaches the maximum and the value $(d_{i,ch_j}+d_{ch_j,BS})$ reaches the minimum, the non-cluster head node selects the cluster head with a larger value and closer to the ship base station and joins the corresponding cluster set.

Figure 3:
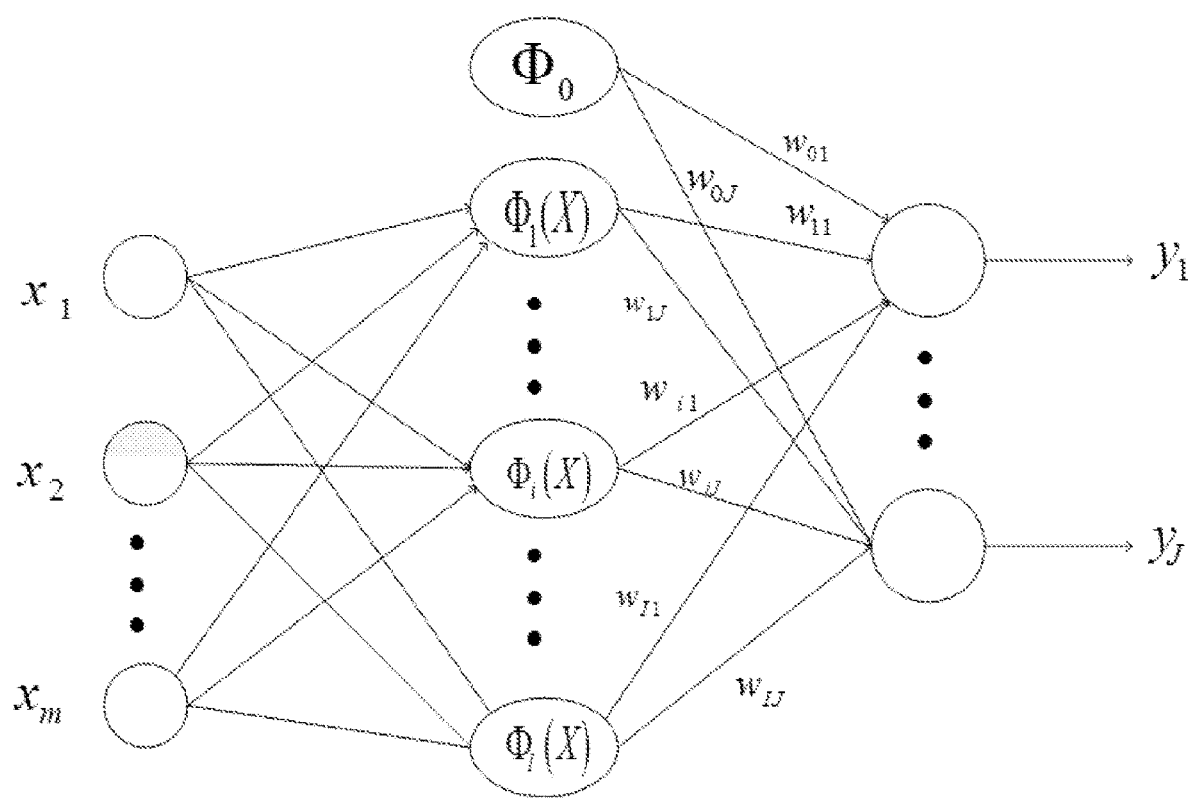
FIG. 3 is a topology diagram of the radial basis function neural network (RBFNN) structure.

The S2 specifically includes:

The data loss value of the MWSNs is a very complex dynamic parameter, and a radial basis function neural network (RBFNN) may arbitrarily approximate any nonlinear relationship by training historical data. Therefore, after the nodes of the MWSNs are clustered, in order to further improve the accuracy of data prediction, the disclosure uses the improved RBFNN to accurately predict the lost marine data value of the nodes. The topology diagram of the RBFNN structure is shown in FIG. 3:

a commonly used radial basis function is a following Gaussian functions:

$$\phi(X_k, X_i) = \exp\left(-\frac{1}{2\sigma^2}\|X_k - X_i\|\right) \quad (6)$$

an actual output is set as $Y_k=[y_{k1}, y_{k2}, \ldots, y_{kj}, \ldots, y_{kJ}]$, J is the number of output units, then when the training sample $X_k$ is input, the j-th output neuron result of the network is:

$$y_{kj} = w_{0j} + \sum_{i=1}^{J} w_{ij}\phi(X_k, X_i), j = 1, 2, \ldots, J \quad (7)$$

where $\sigma$ is a width of a basis function, $X_i$ is the center of the basis function, k is the number of hidden layer nodes, and $w_{ij}$ is a weight between the i-th hidden neuron and the j-th output neuron. The optimal number of hidden layer nodes k and the center $X_i$ of a hidden layer basis function are determined by a clustering technology in the IHEBM routing protocol. When the cluster center is selected, the standard deviation $\sigma$ may be calculated. If Gaussian function is selected as the basis function, the standard deviation is calculated as follows:

$$\sigma = d/\sqrt{2n_{max}} \tag{8}$$

where n is the number of hidden nodes and $d_{max}$ is the maximum distance between the selected cluster centers.

For weight learning, a least mean square (LMS) algorithm is adopt. The input of the LMS algorithm is the output generated by the hidden layer, and a method of directly finding the pseudo-inverse may be adopted, that is $$w = G^+ d \tag{9}$$

where G={$g_{ki}$}, a matrix w=$w_{ij}$, $g_{ki}=\phi(\|X_k-X_i\|^2)$, k=1, 2, ..., K is an output value of the k-th input vector at the i-th hidden layer node, and there are K training input vectors. $(\bullet)^+$ represents a pseudo-inverse, and may be obtained by a singular value decomposition.

In the data loss cluster, the improved RBFNN optimal structure is obtained by training massive marine data, and then the node lost data is accurately predicted by Formula (7).

The S3 specifically includes:

if the cluster head node directly sends all marine data to the ship base station without data compression, it will generate great communication overhead, resulting in the quick energy consumption of the cluster head nodes. The present disclosure proposes the centralized PCA method to reduce the temporal and spatial redundancy of data between adjacent nodes in each cluster. Another reason for adopting the PCA method is that the PCA method provides an effective method to reduce the data transmission from the cluster head node to the ship base station. The PCA method compresses data by preserving the characteristics of the original data set without losing the original information as much as possible. Due to the nonparametric characteristics of the PCA (parameters may be calculated) and the simplicity of the method, the PCA technology has been widely used in wireless sensor networks, such as intrusion detection, image compression and network coverage.

In marine environmental monitoring, the nodes of the MWSNs; periodically collect environmental data and send the data to the ship base station. Here, the centralized PCA method is used to perform data compression at the cluster head node and data reconstruction at the ship base station. Compared with distributed solutions, the centralized PCA method has many advantages, such as perfect matching cluster set based on network structure, effective reduction of frequent communication with neighbor nodes and extension of network life cycle. When networking is connected in a distributed way, all marine sensor nodes should not only collect, process and transmit perception data, but also be responsible for transmitting data from the neighbor nodes. For the centralized scheme, marine data compression activities are only carried out at the cluster head node, and the cluster heads rotate periodically to balance the energy consumption of the network. The centralized PCA method proposed by the present disclosure is described as follows:

step 1: obtaining the initial marine perception data in the sampling period. The initial data obtained by the cluster head includes following three parts: (1) the real marine sensing measurement value sent by the cluster member node to the cluster head; (2) the predicted value generated at the cluster head; and (3) the real measurement value of the cluster head node. $X=[x_1, x_2, \ldots, x_M]^T \in \mathfrak{R}^{M \times P}$ represents a given perceptual data set, M and P represent respectively a discretization time threshold and a number of nodes in the cluster. That is, the row vectors of X corresponds to P sensor nodes, and the column vectors of X corresponds to the measured values sent by all cluster member nodes to the cluster head node in the sampling period M;

step 2: centralizing marine perception data. For the matrix X, the average value $\bar{x}$ is subtracted from the row vector $x_i$ in i-th row to obtain the centralized matrix $X_{mean}$, where $$\bar{x} = \frac{1}{M}\sum_{i=1}^{M} x_i;$$

step 3: calculating the principal component. Decomposing the covariance matrix $$C = \frac{1}{M} X_{mean}^T X_{mean}$$

into eigenvalues, and sorting the obtained eigenvalues as $\lambda_1 \geq \lambda_2 \geq \ldots \geq \lambda_p$ according to size, and obtaining a component importance score matrix $B=X_{mean}A=[b_1, b_2, \ldots, b_p]$. Where $A=[\lambda_1, \lambda_2, \ldots, \lambda_p]$. a cumulative contribution rate T(q) of the first q principal components is defined as follows:

$$T(q) = \frac{\sum_{i=1}^{q} \lambda_i}{\sum_{i=1}^{P} \lambda_i}; \tag{10}$$

and step 4: obtaining original marine data and returning the original marine data. Taking $\tilde{B}=[b_1, b_2, \ldots, b_q]$ as scores of the first q principal components of the matrix $X_{mean}$. Calculating the exact approximation of $X_{mean}$ by using these principal components as follows: $\tilde{Y}=\tilde{B}\tilde{A}^T$, where $\tilde{A}=[\lambda_1, \lambda_2, \ldots, \lambda_q]$. If q=p, it means that there is no information loss.

The accuracy of marine perception data reconstruction may be ensured by choosing an appropriate value of q, and the data set may be reconstructed with a small data loss rate after dimensionality reduction by using the centralized PCA method. In the data compression and reconstruction of the MWSNs, the ship base station may reconstruct the data only by obtaining two data matrices ($\tilde{B}_{M \times q}$ and $\tilde{A}_{P \times q}$) and the mean value $\bar{x}$. The reconstruction value Y of the original marine data is calculated as follows:

$$Y = \tilde{B}\tilde{A}^T + \bar{X}, \bar{X} = [\bar{x}_1, \bar{x}_2, \ldots, \bar{x}_p] \tag{11}$$

Figure 4:
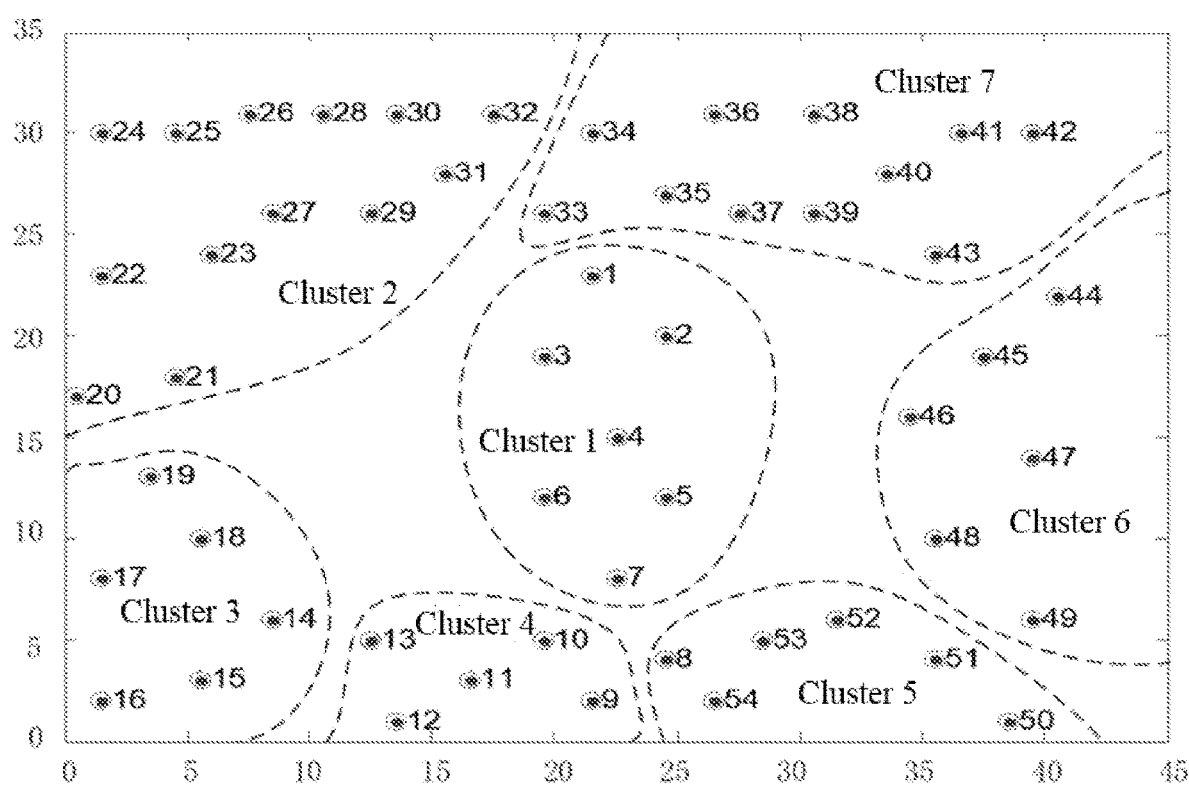
FIG. 4 is a graph showing the location topology and clustering results of 54 nodes.

The proposed method is simulated and verified by the data set of Intel Lab project, and compared with two representative algorithms (KNN, MASTER). MATLAB R2014a software is used for simulation experiment and analysis. Intel experimental data is a temperature and humidity data set collected by 54 Mica 2DOT sensor nodes, and deployed in the laboratory of Intel Berkeley University, and the data collection time was from February 28th to May 5, 2004. According to the proposed IHEBM routing protocol, 54 nodes are divided into 7 clusters, and location topologies and clustering results are shown in FIG. 4. Two data sets, cluster 2 (including nodes 20-32) and cluster 4 (including nodes 9-13), are selected in the embodiment to verify the proposed lost data prediction method, where node 27 and node 11 are selected respectively as the cluster head of the cluster 2 and the cluster head of the cluster 4.

Figure 5:
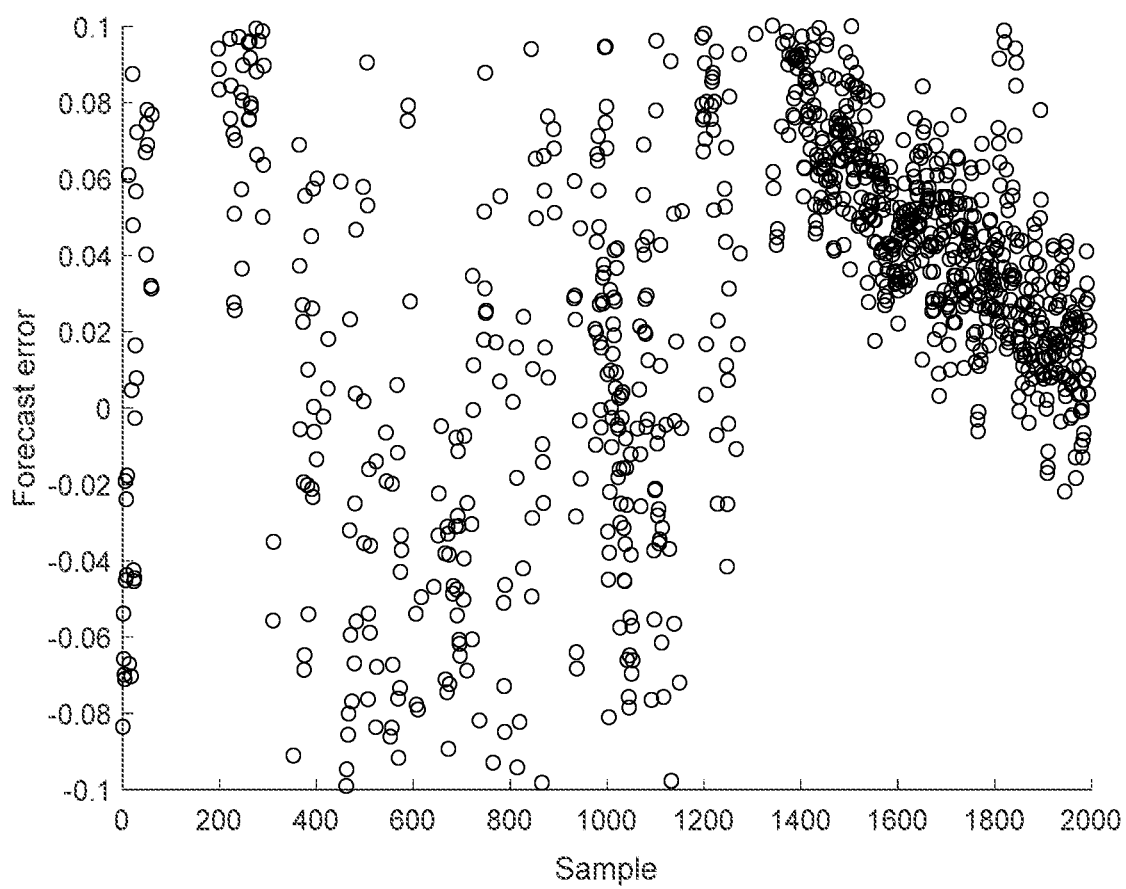
FIG. 5 is a data prediction error diagram of the method of the present disclosure.

FIG. 5 shows the data prediction error of the proposed method. The historical round data of the node N27 and the current round data of other nodes in the cluster are used to predict the temperature data loss information. 2000 temperature data of the node N27 are selected for simulation and prediction. It may be seen from the FIG. 5 that the data prediction error is in a range of ±0.1°. In marine environmental monitoring data acquisition, the proposed prediction method module is embedded in the cluster head node, and if the predicted value obtained by using the proposed method and the actual monitoring data at the cluster head node meet the preset error threshold, the predicted value is used at the cluster head node to replace the real marine acquisition data value. The amount of data transmission in the cluster is greatly reduced, that is, the network energy consumption is effectively reduced.

Figure 6:
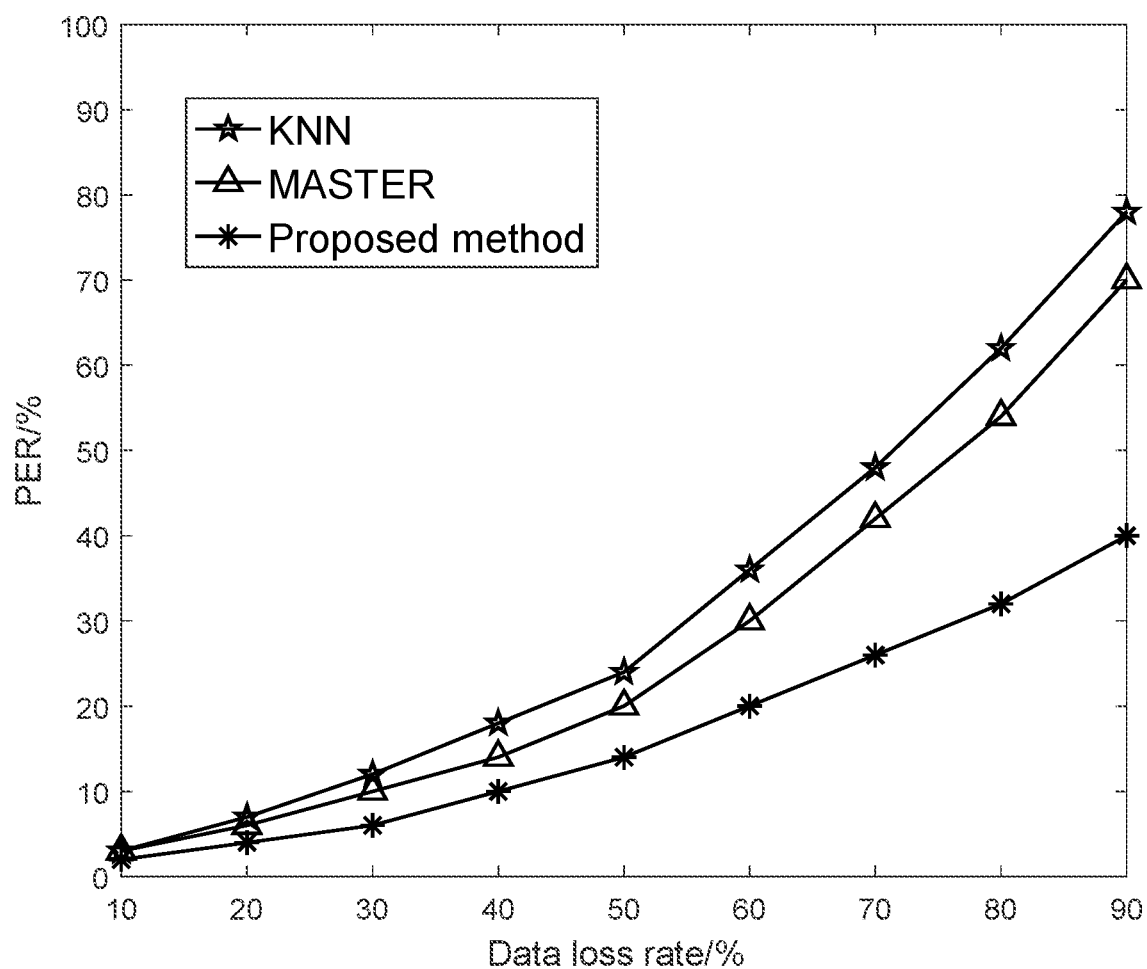
FIG. 6 is a comparison chart of data prediction performances of the proposed method, MASTER and K-Nearest Neighbor (KNN).

FIG. 6 shows the comparison of data prediction performance among the proposed method, MASTER and KNN. The data loss rate is set between 10% and 90%. The X-axis represents the loss probability, and the Y-axis represents the prediction error ratio (PER). The smaller the PER value, the more accurate the data prediction is. Generally speaking, PER increases with the increase of data loss rate. The method provide by that disclosure has the best performance under the marine temperature data set, that is, the data per value of the method provided by the disclosure is the smallest under the condition of the same data loss rate. Even if 80% of the marine data is lost, the prediction error of the proposed method is less than 35%, while the prediction error rate corresponding to the KNN algorithm is over 60%, and the prediction error rate of the MASTER algorithm is 54%.

Figure 7:
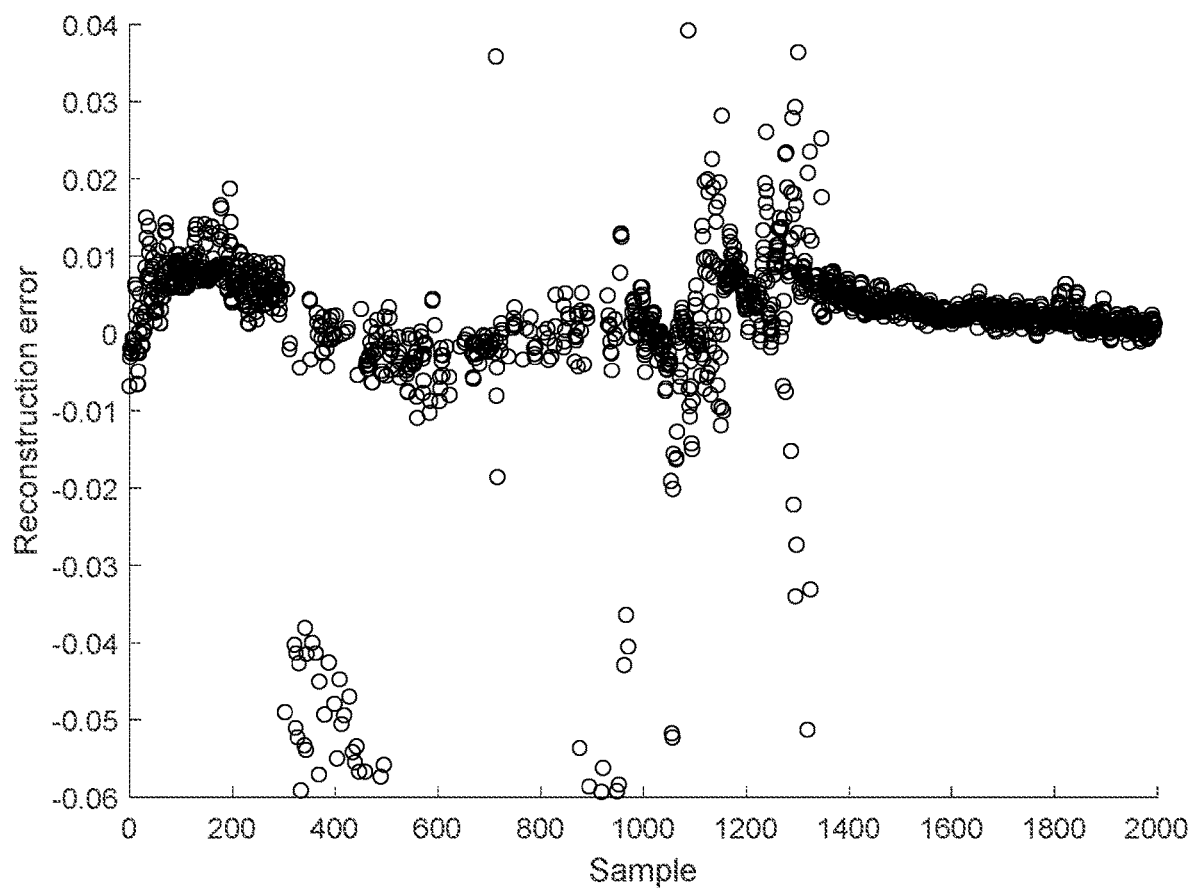
FIG. 7 is a reconstruction error diagram of 1500 temperature data collected by node 10 in cluster 4.

FIG. 7 shows the error diagram of reconstructed data of 2000 marine temperatures collected by node 10 in cluster 4 at the ship base station by using the centralized PCA method. The centralized PCA method is used to effectively compress the marine data at the cluster head node, and realize the recovery and reconstruction of the data at the ship base station. In this process, the data transmission between cluster head nodes and the ship base station is effectively reduced, thus reducing the energy consumption of the network. As can be seen from FIG. 7, the data reconstruction error is within ±0.06°.

Embodiment 2

As a second aspect of the present disclosure, the disclosure also provides an electronic device, including: one or more processors; a memory for storing one or more programs; when the one or more programs are executed by the one or more processors, the one or more processors may realize the lost data reconstruction method of the MWSNs as described above. In addition to the above processor, memory and interface, any device with data processing capability where the device in the embodiment is located may also include other hardware according to the actual function of the device with data processing capability, and no more details about this.

The preferred embodiments of the present disclosure have been described in detail above. It should be understood that those skilled in the art may make many modifications and changes according to the concept of the present disclosure without creative labor. Therefore, any technical scheme that may be obtained by a person skilled in the art through logical analysis, reasoning or limited experiments on the basis of the existing technology according to the concept of the present disclosure should be within the protection scope determined by the claims.

What is claimed is:

1. A method for reconstructing lost data of marine wireless sensor networks (MWSNs), comprising the following steps:
establishing an initial topological structure of the MWSNs;
using a hierarchical energy balance multipath (HEBM) routing protocol to cluster network nodes, wherein goals of clustering MWSNs nodes by the HEBM routing protocol comprise: prolonging a service life of the MWSNs through a distributed energy consumption, realizing clustering in a changing iteration number and obtaining evenly distributed cluster heads; and specific steps of node clustering comprise a cluster head selection and a cluster member formation, wherein specific steps of the cluster head selection are as follows:
calculating a probability of each node being selected as a cluster head candidate node in the MWSNs and broadcasting a first message to other nodes, wherein the first message comprises a node number and the probability of the node being selected as the cluster head candidate node; and indexes used for calculating the probability of a node i selected as the cluster head candidate node comprise: a distance between the node i and a ship base station; residual energies of the node i and neighbor nodes; mutual distances between the node i and the neighbor nodes; and a density of the neighbor nodes of the node i;
if a probability of the node i being selected as the cluster head candidate node is greater than probabilities of all neighbor nodes j of the node i being selected as the cluster head candidate node, finally selecting the node i as the cluster head candidate node; if the probability of the node i being selected as the cluster head candidate node is less than probabilities of all neighbor nodes j of the node i being selected as the cluster head candidate node, sending a join message by the node i to all neighboring nodes having a greater probability of being selected as the cluster head candidate node and the node i being a member node of the cluster; and
broadcasting a second message by each temporary cluster head selected as the cluster head candidate node, wherein the second message comprises a node number and a probability of the node being selected as the cluster head candidate node; when a temporary cluster head $ch_i$ receives the second message broadcast by a temporary cluster head $ch_i$, the temporary cluster head $ch_i$ calculates a distance between the temporary cluster head $ch_i$ and the temporary cluster head $ch_i$; if the distance is greater than or equal to a threshold value $d_{th}$, the second message is ignored; if the distance is less than the threshold value $d_{th}$, and the probability of the node/being selected as the cluster head candidate node is less than the probability of the node i being selected as the cluster head candidate node, the temporary cluster head $ch_j$ becomes an ordinary node and sends a join message to the finally selected cluster head $ch_i$;

using a radial basis function neural network (RBFNN) to predict lost data of nodes in the cluster based on a clustering of the nodes, wherein specific steps of predicting node lost data by the RBFNN comprise:

obtaining an optimal structure of the RBFNN by training marine data in a data loss cluster, and accurately predicting node lost data by using the RBFNN after training;

wherein when a training sample $X_k$ is input, a result $y_{kj}$ of a j-th output neuron of the RBFNN is:

$$y_{kj} = w_{0j} + \sum_{i=1}^{I} w_{ij} \phi(X_k, X_i), j = 1, 2, \ldots, J$$

wherein $X_i$ is a center of a basis function, k is a number of hidden layer nodes, $w_{ij}$ is a weight between an i-th hidden neuron and the j-th output neuron, and $\phi(X_k, X_i)$ is a radial basis function; the optimal number k of the hidden layer nodes and the center $X_i$ of the basis function of the hidden layer of the RBFNN are determined by a clustering technology in the HEBM routing protocol; and using a centralized principal component analysis (PCA) method to compress and reconstruct data of a cluster head node in a process of data transmission from cluster heads to the ship base station, wherein specific steps of compressing and reconstructing the cluster head node data by using the centralized PCA method are as follows:

obtaining initial marine perception data in a sampling period, wherein the initial marine perception data obtained by the cluster head comprises: a real marine sensing measurement value sent by a cluster member node to the cluster head, a predicted value generated at the cluster head and a real measurement value of the cluster head node; $X=[x_1, x_2, \ldots, x_M]^T \in \mathbb{R}^{M \times P}$ represents a collected perceptual data set, M and P represent respectively a discretization time threshold and a number of nodes in the cluster, row vectors of the perceptual data set X corresponds to sensor nodes, and column vectors of the perceptual data set X corresponds to the measured values sent to the cluster head node by all cluster member nodes in a sampling period M;

centralizing the initial marine perception data to obtain a centralization matrix $X_{mean}$;

calculating a principal component, decomposing a covariance matrix $$C = \frac{1}{M} X_{mean}^T X_{mean}$$

into eigenvalues, sorting the calculated eigenvalues according to a size $\lambda_1 \leq \lambda_2 \leq \ldots \leq \lambda_p$, and obtaining a component importance score matrix B:

$$B = X_{mean} A = [b_1, b_2, \ldots, b_p]$$

wherein $A=[\lambda_1, \lambda_2, \ldots, \lambda_p]$;

a cumulative contribution rate T(q) of first q principal components is defined as follows:

$$T(q) = \frac{\sum_{i=1}^{q} \lambda_i}{\sum_{i=1}^{P} \lambda_i}$$

obtaining original marine data and returning the original marine data, and recording $\tilde{B}=[b_1, b_2, \ldots, b_q]$ as scores of a first q principal components of the centralization matrix $X_{mean}$, q is less than p; an exact approximation of $X_{mean}$ is calculated as follows:

$$\tilde{Y} = \tilde{B} \tilde{A}^T$$

wherein $\tilde{A}=[\lambda_1, \lambda_2, \ldots, \lambda_q]$, if q=p, no information is lost; and based on data matrix $\tilde{B}_{M \times q}$, $\tilde{A}_{p \times q}$ and a mean value, a reconstruction data Y of the original marine data is as follows: $Y = \tilde{B}\tilde{A}^T + \tilde{X}$, $\tilde{X}=[\tilde{x}_1, \tilde{x}_2, \ldots, \tilde{x}_p]$.

2. The method for reconstructing lost data of MWSNs according to claim 1, wherein the probability P (node i=ch) of the node f being selected as the cluster head candidate node is specifically expressed as follows:

$$P(\text{node } i = ch) = \min \sum_{i,j=1}^{n} ((\partial_1(i,j), \partial_2(i,j), \partial_3(i,j))$$

$$\partial_1(i,j) = 1 - \eta_1 \left(1 - \ln\left(\frac{d_{i,BS}}{d_{j,BS}}\right)\right)$$

$$\partial_2(i,j) = 1 - \eta_2 \left(1 - \ln\left(\frac{\mu_i}{\mu_j}\right)\right)$$

$$\partial_3(i,j) = 1 - \eta_3 \left(1 - \ln\left(\frac{E_i}{E_j}\right)\right)$$

wherein $d_{i,BS}$ is a distance between the node i and the ship base station BS, $d_{j,BS}$ is a distance between the neighbor node j of the node i and the ship base station BS, $\mu_i$ is a number of neighbor nodes of the node i, $\mu_j$ is a number of neighbor nodes of the neighbor node j of the node i, $E_i$ and $E_j$ are residual energies of the node i and the neighbor node/respectively, $\eta_1$, $\eta_2$ and $\eta_3$ are constants; and the greater the value P (node i=ch) is, the greater the probability of the node i to be the cluster head is.

3. The method for reconstructing lost data of MWSNs according to claim 2, wherein specific steps of the cluster member formation comprise:

sending a third broadcast message by the cluster head to neighbor nodes of the cluster head; selecting the cluster head with a higher probability of being selected as the cluster head candidate node and closer to the ship base station by a non-cluster head node, and sending a join message by the non-cluster head node to the corresponding cluster head node to join a cluster set after receiving the third broadcast message.

4. The method for reconstructing lost data of MWSNs according to claim 3, wherein the non-cluster head node calculates Join; after receiving the third broadcast message:

$$\text{Join}_{ch,j} = \min \left( \frac{P(\text{node } j = ch)}{d_{i,ch,j} + d_{ch_j,BS}} \right)$$

wherein $d_{i,ch_j}$ is a distance from a non-cluster head node i to the cluster head node $ch_j$, $d_{ch_j,BS}$ is a distance between the cluster head node ch; and the ship base station BS; P (node j=ch) is a probability of the cluster head node j being selected as the cluster head candidate node; and when a value of $Join_{ch,j}$ reaches the minimum, a value of P (node j=ch) reaches the maximum and a value of $(d_{i,ch_j}+d_{ch_j,BS})$ reaches the minimum, the non-cluster head node selects the cluster head with a larger value and closer to the ship base station and joins the corresponding cluster set.

5. The method for reconstructing lost data of MWSNs according to claim 3, wherein a clustering radius of the node is a time-varying value with a change of the network topology, and is dynamically adjusted by comprehensively considering node mobility, network loads and a number of broadcast messages of the cluster head candidate node.

* * * * *